(12) United States Patent
Oehl et al.

(10) Patent No.: US 9,938,738 B2
(45) Date of Patent: *Apr. 10, 2018

(54) THEATER ENTRANCE

(71) Applicant: DOLBY LABORATORIES LICENSING CORPORATION, San Francisco, CA (US)

(72) Inventors: Wilhelm Oehl, San Francisco, CA (US); David Herman, Oakland, CA (US); Vincent Voron, Menlo Park, CA (US); Donald Burlock, San Bruno, CA (US); Pascal Sijen, La Quinta, CA (US); Christopher Roy Kukshtel, Sonoma, CA (US)

(73) Assignee: DOLBY LABORATORIES LICENSING CORPORATION, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/374,576

(22) Filed: Dec. 9, 2016

(65) Prior Publication Data

US 2017/0121991 A1    May 4, 2017

Related U.S. Application Data

(63) Continuation of application No. 14/556,178, filed on Nov. 30, 2014, now Pat. No. 9,551,161.

(51) Int. Cl.
*E04H 3/22* (2006.01)
*E04H 3/30* (2006.01)
(Continued)

(52) U.S. Cl.
CPC ............... *E04H 3/30* (2013.01); *E04F 19/02* (2013.01); *E04H 3/12* (2013.01); *E04H 3/22* (2013.01)

(58) Field of Classification Search
CPC .... E04H 3/10; E04H 3/22; E04H 3/24; E04H 3/30
(Continued)

(56) References Cited

U.S. PATENT DOCUMENTS 1,437,946 A    12/1922    Miller
1,957,947 A    9/1931    Dreyfuss
(Continued)

FOREIGN PATENT DOCUMENTS

CN    201930529 U    1/2011
WO    2006111659    4/2006

OTHER PUBLICATIONS

Alexander Wong, UA Shenzhen, images 5-10 at <http://www.alexanderwong.com.hk/ua_shenzhen.htm>, available at least as early as Oct. 16, 2013.

(Continued)

*Primary Examiner* — Robert Canfield
(74) *Attorney, Agent, or Firm* — Saidman DesignLaw Group, LLC

(57) ABSTRACT

The present disclosure is directed to an entrance to a theater of the type normally used to show motion pictures. The motion picture theater entrance has distinctive outer walls separating a vestibule from a lobby. The vestibule has a curved image projection wall located inside said vestibule and is connected to a viewing area by a curved walkway. The entrance also may include border lighting along the upper and or lower edges of its walls.

31 Claims, 9 Drawing Sheets

(51) Int. Cl.
*E04H 3/12* (2006.01)
*E04F 19/02* (2006.01)

(58) Field of Classification Search
USPC .......................................... 52/6, 174; 472/75
See application file for complete search history.

(56) References Cited

U.S. PATENT DOCUMENTS

| | | | |
|---|---|---|---|
| 1,896,652 A * | 2/1933 | Vitolo | ........................ E04H 3/28 |
| | | | 472/75 |
| 2,259,646 A | 10/1941 | Liehburg | |
| 2,831,217 A * | 4/1958 | Lombardo | ................ E04H 3/10 |
| | | | 472/92 |
| 3,293,807 A | 12/1966 | Ramsell | |
| 3,313,068 A | 4/1967 | Pinto | |
| 3,399,501 A | 9/1968 | Rossman | |
| 3,487,595 A | 1/1970 | Schumann | |
| 3,823,517 A | 7/1974 | Penaloza | |
| 4,962,420 A | 10/1990 | Judenich | |
| 5,469,669 A | 11/1995 | Alter | |
| 5,964,064 A | 10/1999 | Goddard et al. | |
| 6,074,307 A | 6/2000 | Hettema et al. | |
| 6,164,018 A * | 12/2000 | Runge | ........................ E04H 3/22 |
| | | | 52/174 |
| 6,865,830 B2 | 3/2005 | Gravitt et al. | |
| 8,116,081 B2 | 2/2012 | Crick, Jr. | |
| D739,558 S | 9/2015 | Oehl et al. | |
| D739,560 S | 9/2015 | Oehl et al. | |
| D774,207 S | 12/2016 | Oehl et al. | |
| 2005/0038749 A1 | 2/2005 | Fitch et al. | |
| 2008/0079908 A1 | 4/2008 | Choi | |
| 2012/0188513 A1 | 7/2012 | Choi | |

OTHER PUBLICATIONS

Cinema City Cotroceni Megaplex Opens in Bucharest; Global city Holdings at <http://globalcityholdings.com/a/761,cinema-city-cotroceni-megaplex-opens-in-bucharest-23-november-2009->, available at least as early as Nov. 23, 2009.
Panasonic Center Osaka, Case Study—Projector, Panasonic, available at least as early as Nov. 30, 2014.

* cited by examiner

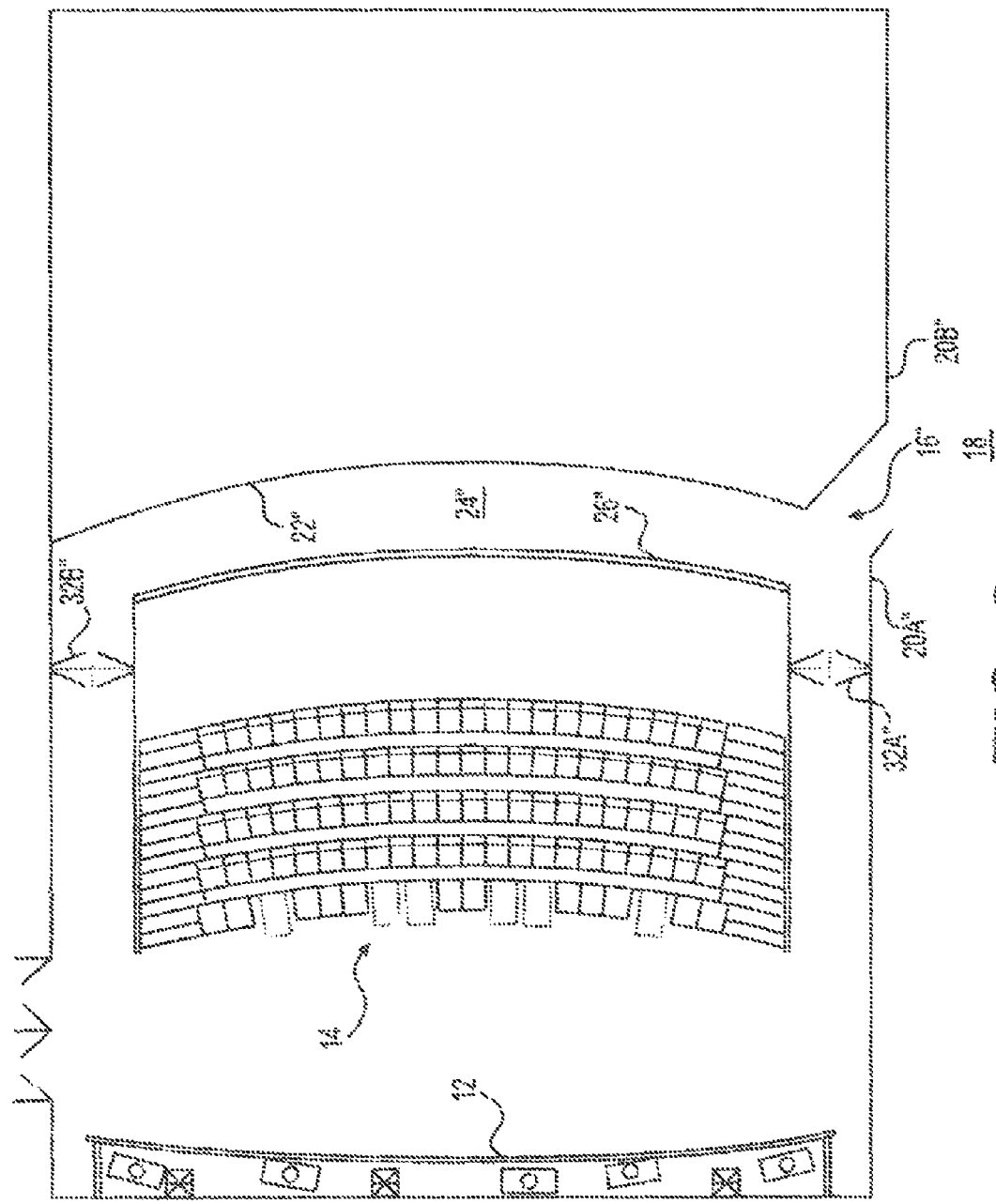

THEATER ENTRANCE

CROSS-REFERENCE TO RELATED APPLICATION

This application is a continuation of prior pending U.S. application Ser. No. 14/556,178, filed Nov. 30, 2014, the entirety of which is expressly incorporated by reference herein.

FIELD OF THE DISCLOSURE

The present disclosure is generally directed to a theater entrance of the type that is typically used as the entrance to a motion picture theater.

BACKGROUND OF THE DISCLOSURE

Motion picture theaters have been in existence for over a century and are well known in the art. The design for these theaters has evolved over time, from single screen movie houses showing one film at a time to very large multiplexes having dozens of individual theaters running different films simultaneously. But despite offering such a wide variety of entertainment options, audience attendance at movie theaters has declined.

New developments in digital technology have made home entertainment systems more advanced and accessible and so consumers have a wide variety of options such as DVD rentals, video streaming, etc. Although visiting a motion picture theater was once the only way one could see a film, now nearly every film is available instantaneously via video streaming or downloading from the comfort of one's couch at home. Those who continue to frequent motion picture theaters now do so as much for the whole theater-going experience as to watch the films themselves.

Multiplex owners have observed this trend and motion picture theaters are now being designed with this experience in mind. Special theater designs combine visual, audio, and other sensory features so that the audience is fully immersed. The audience does not merely watch a film; the audience experiences it.

Multiplexes usually include a variety of theater types so that audience members may select which type of experience they prefer. Basic 35 mm films may be suitable for some patrons while others prefer to have the option of seeing their films shown in a higher quality format (e.g. 70 mm film, digital projection, 4K Digital projection, and other developing formats) and in a theater fitted with premium features such as stadium seating, digital sound, or customized theater geometry. However, installing these premium features into a theater comes at a higher price than a basic, staggered row 35 mm projection theater and, therefore, the resulting cost is passed down to the audience members each time they purchase a ticket to one of these high quality performances.

However, the standard layout of most multiplexes and theaters does not allow for any differentiation between basic 35 mm theaters and theaters providing a higher quality, immersive experience. Frequently, the first indication that one theater is different from another occurs only after the audience enters the viewing area and the on-screen advertisements begin. Therefore, audience members may not be getting the whole experience that they desire to justify the higher ticket prices.

Thus, a need exists for a theater entrance designed in a distinctive manner so that the audience is able to distinguish a premium theater from a standard multiplex theater. The theater entrance may possess a variety of distinctive features that indicate to the audience that a different experience lies beyond the entryway from the lobby. It is important that the theater entrance have a distinct, dramatic appearance so that audience members' attention is drawn to the entryway. By creating a new, innovative theater entrance, an audience member's experience and journey begins right when he or she first approaches the theater entrance, whether it be a stand-alone movie house, or within a multiplex.

SUMMARY OF THE DISCLOSURE

The present disclosure relates to a motion picture theater having an entrance that includes an entryway between a lobby and a vestibule. The entryway is flanked by a flat outer wall. A convex image projection wall is in the vestibule that is visible from the lobby, and a curved walkway is located between the vestibule and a viewing area that is further inside the theater. The present disclosure also relates to a theater entrance that may include distinctive border lighting around the edges of the walls of the vestibule, the flat outer wall, as well as the image projection wall.

BRIEF DESCRIPTION OF THE DRAWINGS

In the accompanying drawings that form a part of the specification and are to be read in conjunction therewith, illustrate by way of example and not limitation, with like reference numerals referring to like elements, wherein:

FIG. 9 is a schematic top view of a still further alternative design of a motion picture theater with an entrance.

DETAILED DESCRIPTION

Figure 1:
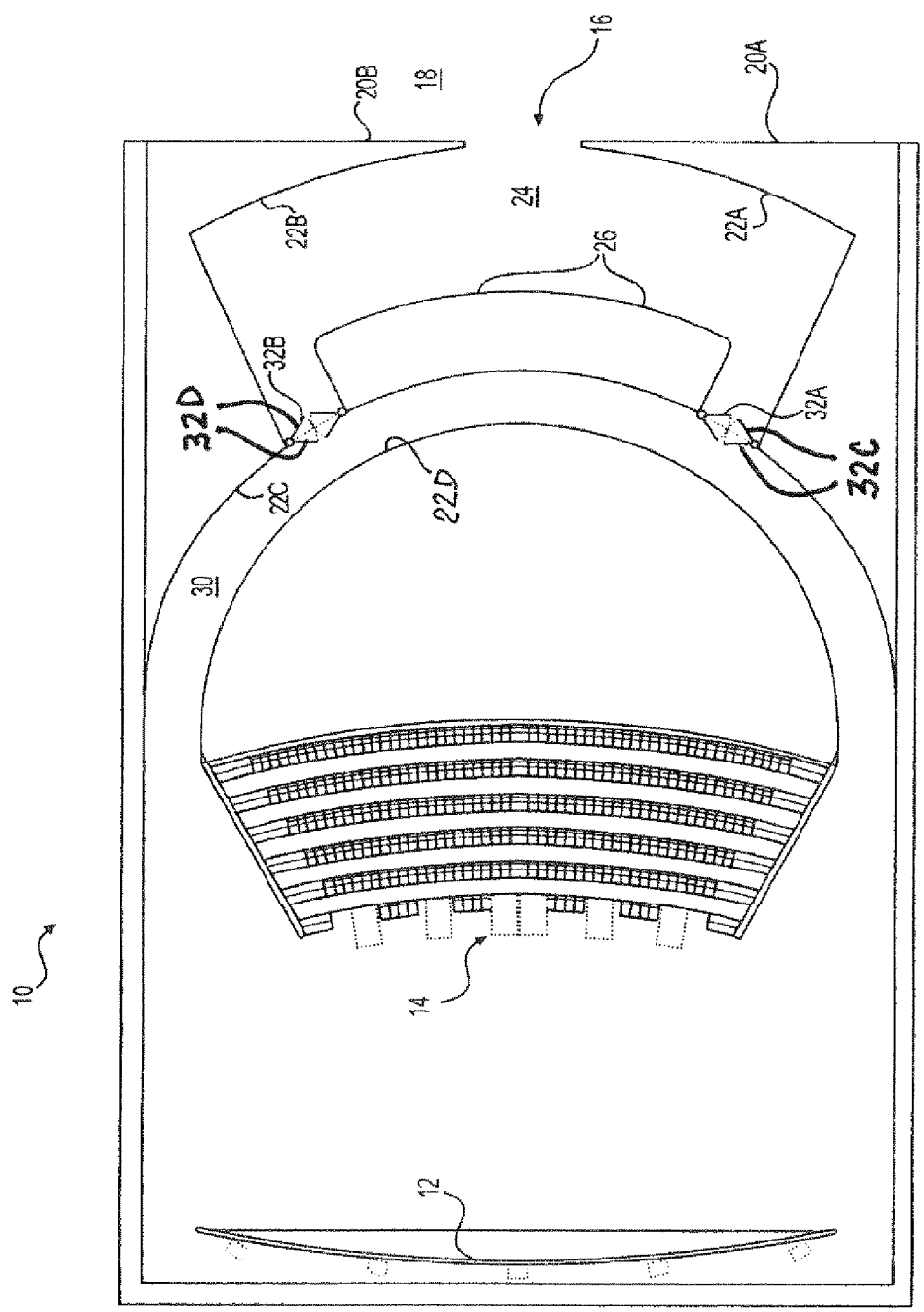
FIG. 1 is a top schematic view of a motion picture theater with an entrance.

Referring to FIG. 1, a motion picture theater having a novel entrance design is indicated generally by reference numeral 10. Theater 10 includes a screen 12 and a viewing or seating area 14 for audience members. The viewing area may include seats, benches, handrails, stairs, or floor space so that the audience may stand or sit in the viewing area. Seating in the viewing area may be arranged in stadium-style, staggered rows, or any other orientation that comfortably allows audience members to view screen 12.

The theater 10 has an entryway 16, centrally located in this example, where audience members may enter and exit the theater. The entryway 16 is oriented so that the audience members walk from a lobby 18 and pass through the entryway 16 on their way to the viewing area 14. The opening of entryway 16 is defined by outer walls 20A/20B.

Inside entryway 16 is a vestibule 24 where the audience members can gather or pass through on their way to the viewing area 14. The vestibule 24 has inner walls 22A/22B, which may be curved.

On one side of vestibule 24 is an image projection wall 26 positioned opposite entryway 16, so that image projection wall 26 is visible within vestibule 24 as well as outside entryway 16 and in lobby 18. The image projection wall 26 may be convexly curved similarly to the shape of vestibule 24 so that it remains visible from nearly every position within vestibule 24. Curved inner walls 22A/22B and curved image projection wall 26 create a curved pathway for vestibule 24.

After passing through the vestibule 24, audience members can walk along walkway 30 to the viewing area 14. Walkway 30 may have one or more entrances or doorways 32A/32B having doors 32C and 32D located at opposing ends of vestibule 24 that serve to block the sounds originating in the lobby 18 and vestibule 24 from being heard within the viewing area 14. The doors 32C and 32D may be opened into vestibule 24 or away from image projection wall 26.

Figure 2:
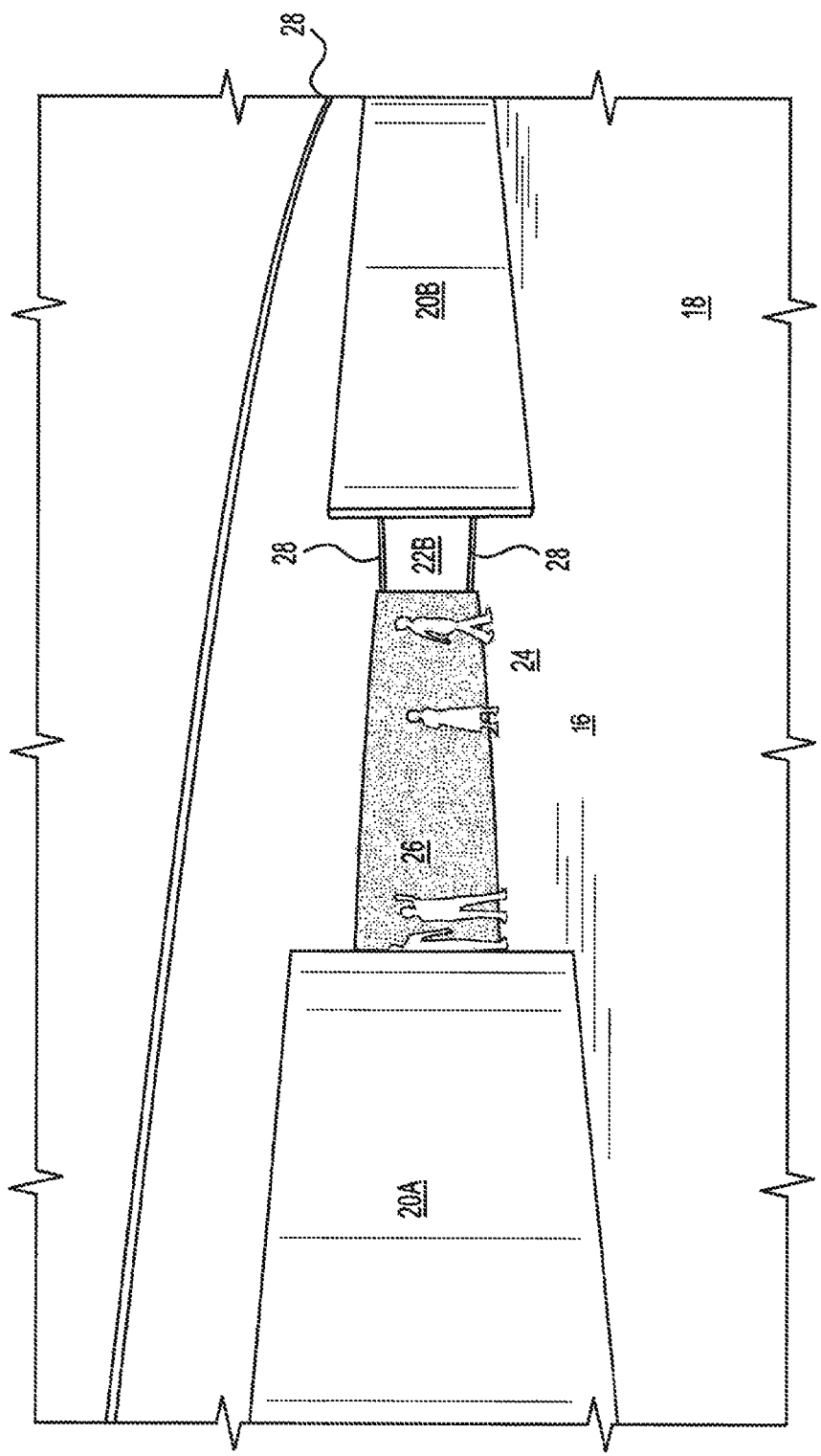
FIG. 2 is a front perspective view of the theater entrance shown in FIG. 1.

FIG. 2 illustrates a perspective view of entryway 16 that may be substantially centered between the two outer walls 20A and 20B. Outer walls 20A and 20B may be substantially planar so that they provide a distinctive and uniform division between lobby 18 and vestibule 24.

Figure 3:
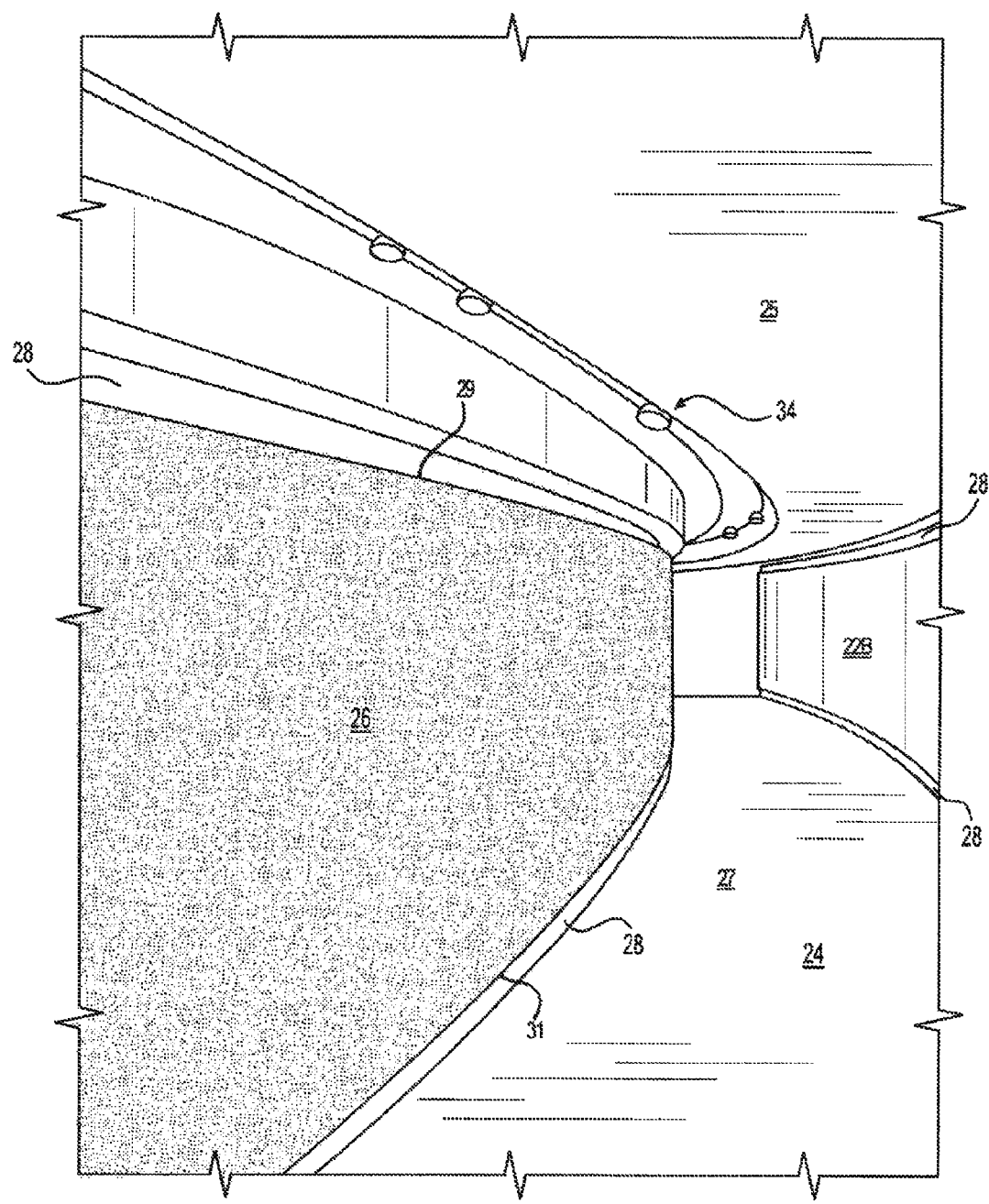
FIG. 3 is another front perspective view of the theater entrance, from a position in the vestibule.

As shown also in FIG. 3, to further enhance the distinctiveness of entryway 16, border lighting 28 may be provided either above and/or below inner walls 22A/22B and/or image projection wall 26. Border lighting 28 consists of a light source (e.g., an LED strip) that is concealed in a wall recess located behind the top edge 29 and/or bottom edge 31 of image projection wall 26. Because the light source is positioned within the wall recess and angled so that light extends along the adjacent wall, the light source itself remains hidden within the recess while providing a smooth and continuous border lighting 28 along the adjacent walls regardless of whether or not the walls are flat or curved. The border lighting 28 can be one solid color, multicolored, and may also have special behaviors such as, but not limited to, blinking, chasing, fading, or color-changing effects.

The image projection wall 26 is directly opposite the entryway 16 as shown in FIG. 2 and extends substantially between the floor 27 to the ceiling 25 of the vestibule 24. Alternatively, as shown in FIG. 3, image projection wall 26 may extend less than the full height between the floor and the ceiling of vestibule 24. In such a case, border lighting 28 may be placed between the ceiling 25 of vestibule 24 and the top edge 29 of image projection wall 26, or between the floor 27 of vestibule 24 and the bottom edge 31 of image projection wall 26, or at both the top and bottom edges 29 and 31 of image projection wall 26. Border lighting 28 may also placed at the top and bottom edges of inner wall 22B.

As noted above, border lighting 28 may be positioned at the top and the bottom of image projection wall 26 and also on inner wall 22, and may be placed only at the top or bottom of each wall or, alternatively, not included at all. A plurality of projectors 34 are shown positioned in a recess of ceiling 25 of vestibule 24. The projectors 34 are positioned so that the image projection wall 26 has a continuous image projected across the entire length and height of image projection wall 26. Alternatively, a plurality of different images may be projected along different sections of the image projection wall 26. The projectors 34 are positioned within a recess of ceiling 25 so that they are partially hidden within ceiling 25 of vestibule 24. Projectors 34 are angled such that audience members can approach the image projection wall 26 without blocking the projectors and disturbing or distorting the projected image on the wall. The technology for creating such an image(s) on image projection wall 26 is commercially available from various companies, such as Christie Digital Systems USA, Inc. of Cypress, Calif. Alternatively, the images on projection wall 26 could be achieved via individual displays or display panels, wherein the panels would be curved to conform with the shape of the vestibule 24 and controlled and synchronized to show a large-sized, continuous image across the whole surface of image projection wall 26.

Figure 4:
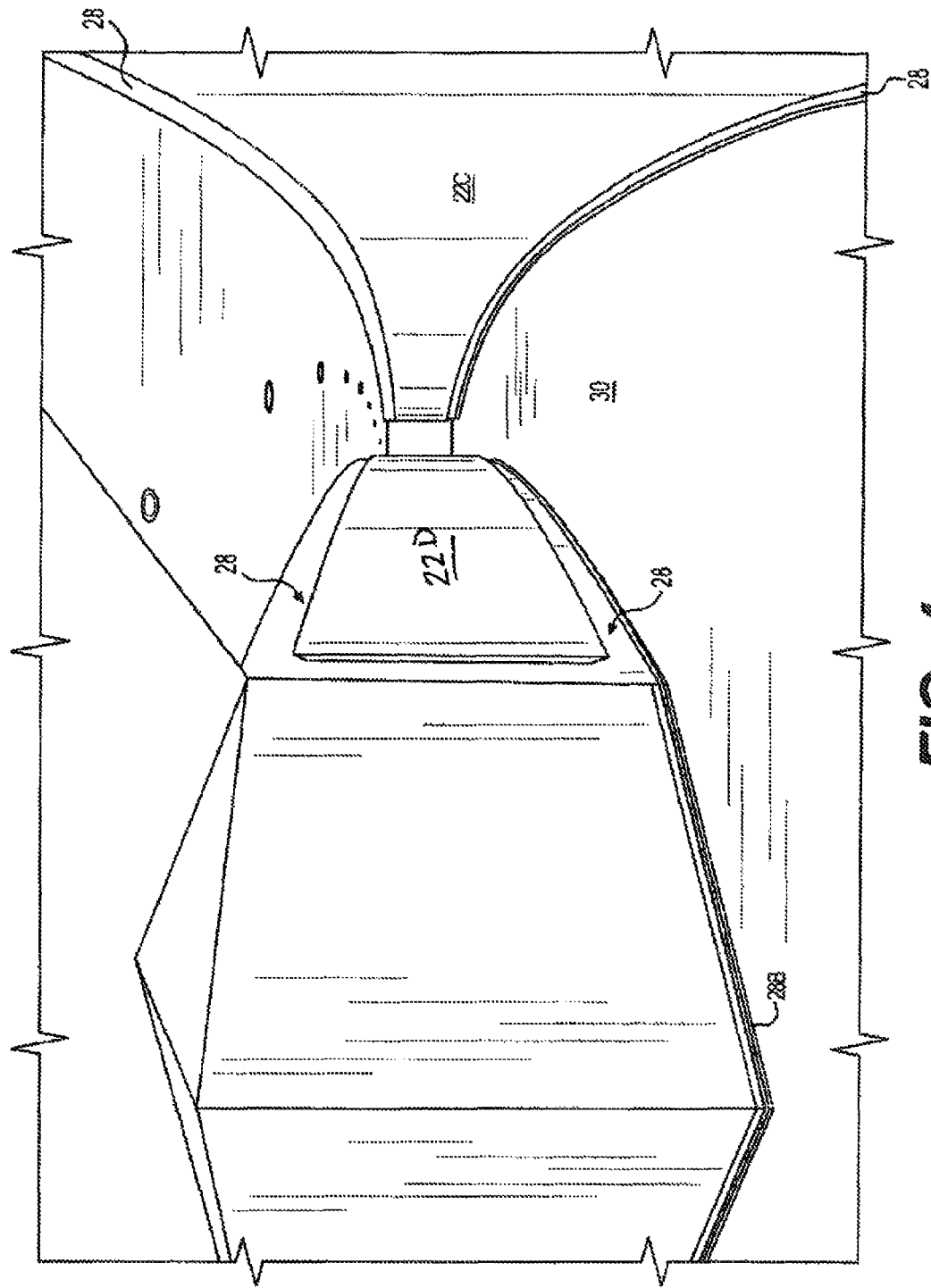
FIG. 4 is a perspective view of the walkway of the theater entrance.

FIG. 4 shows walkway 30 between vestibule 24 and viewing area 14. The walkway 30 is curved and has substantially parallel, curved inner walls 22C and 22D with border lighting 28 shown at both the top and bottom edges of inner walls 22C and 22D. Alternatively, border lighting may be placed at only one edge of the inner walls 22C and 22D or be entirely absent from walkway 30. Border lighting 28 may be concealed in a wall recess located at the top edge or the bottom edge of inner walls 22C and 22D so that the light source itself remains hidden within the recess while providing a smooth and continuous border lighting 28 along the adjacent walls regardless of whether or not the walls are flat or curved. Alternatively, border lighting 28B can be placed along the top or bottom edges so that the light source is visible. The border lighting 28 and 28B can be one solid color, multicolored, and may also have special behaviors such as, but not limited to, blinking, chasing, fading, or color-changing effects.

Figure 5:
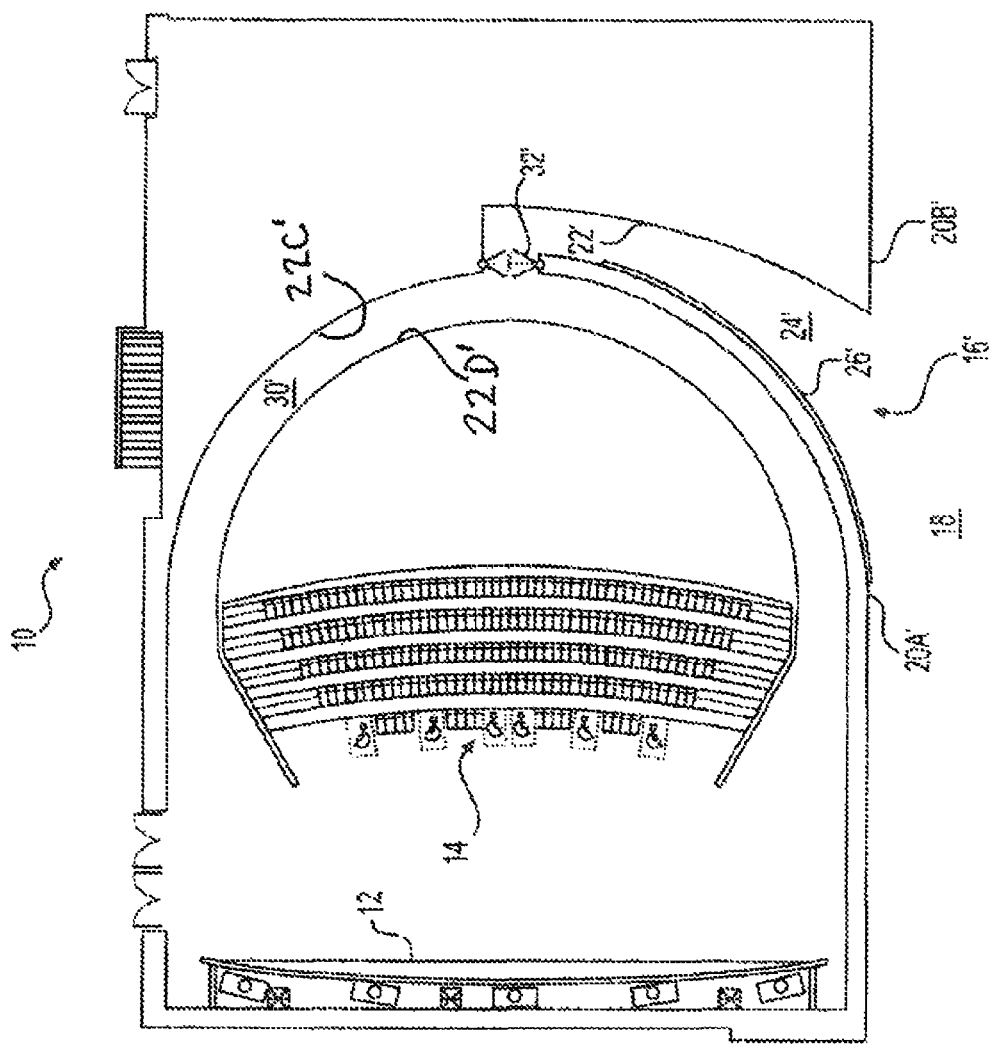
FIG. 5 is a top schematic view of an alternative design of a motion picture theater with an entrance.

FIG. 5 illustrates a plan view of an alternate design of the theater entrance wherein entryway 16' is positioned at an approximate right angle relative to the position of the entryway 16 of FIG. 1. Entryway 16' is shown between two outer walls 20A' and 20B' at one end of vestibule 24' so that it is adjacent to the curved image projection wall 26'. The vestibule 24' has a curved inner wall 22' that is opposite image projection wall 26'. The curved image projection wall 26' and curved inner wall 22' create a curved pathway in vestibule 24'. In this design, there is one doorway 32' that connects vestibule 24' to the curved walkway 30', and doorway 32' is positioned at the far end of vestibule 24', thereby creating a centered, single doorway entrance to walkway 30' and viewing area 14. Walkway 30' includes substantially parallel curved inner walls 22C' and 22D' similar to walls 22C and 22D of walkway 30 of FIGS. 1 and 4. Alternatively, a substantially mirror-image layout to the design shown in FIG. 5, wherein the entryway would be on the opposite side to that shown in FIG. 5, may be employed, as desired.

Figure 6:
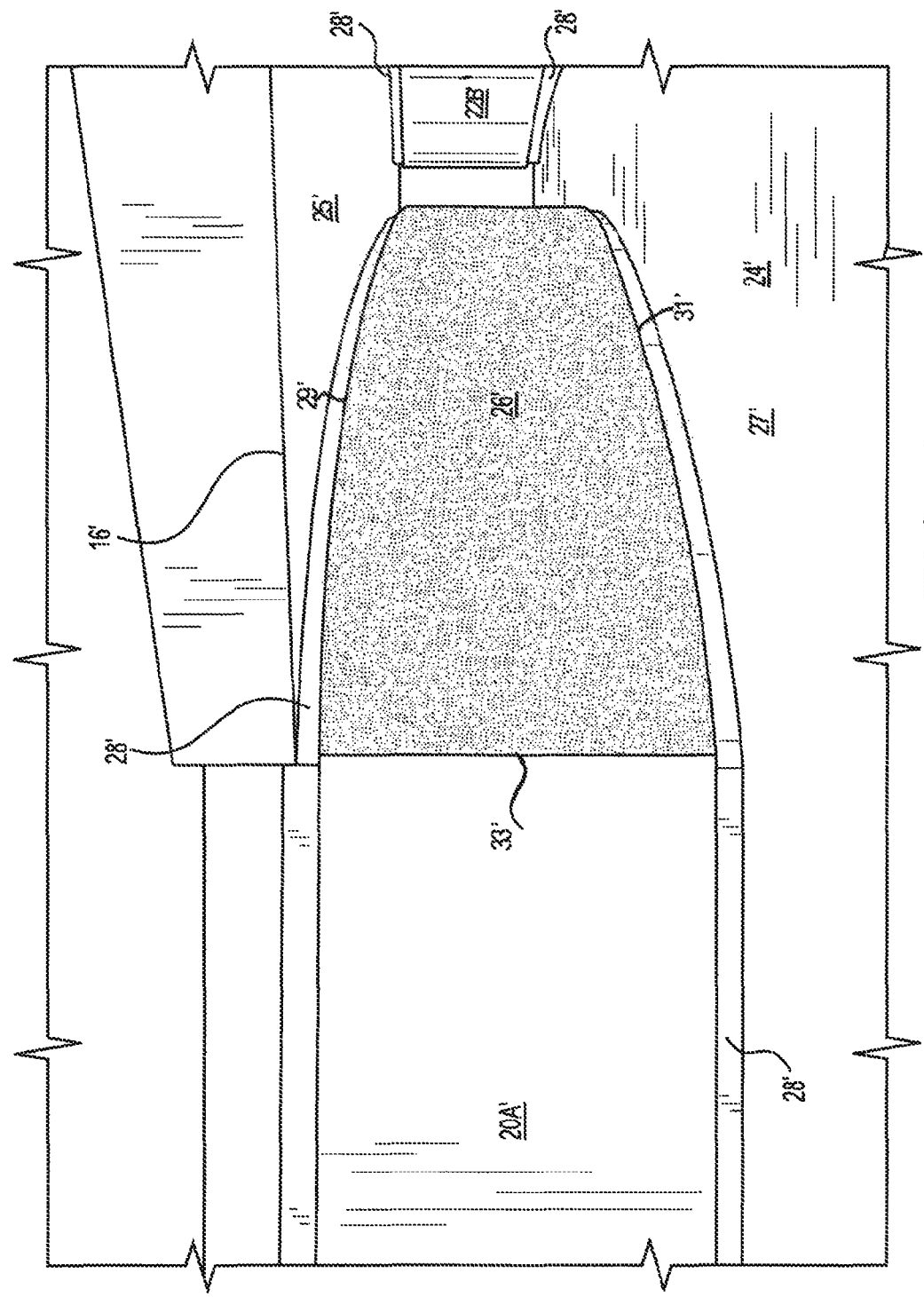
FIG. 6 is a front perspective view of the alternative design of FIG. 5.
Figure 7:
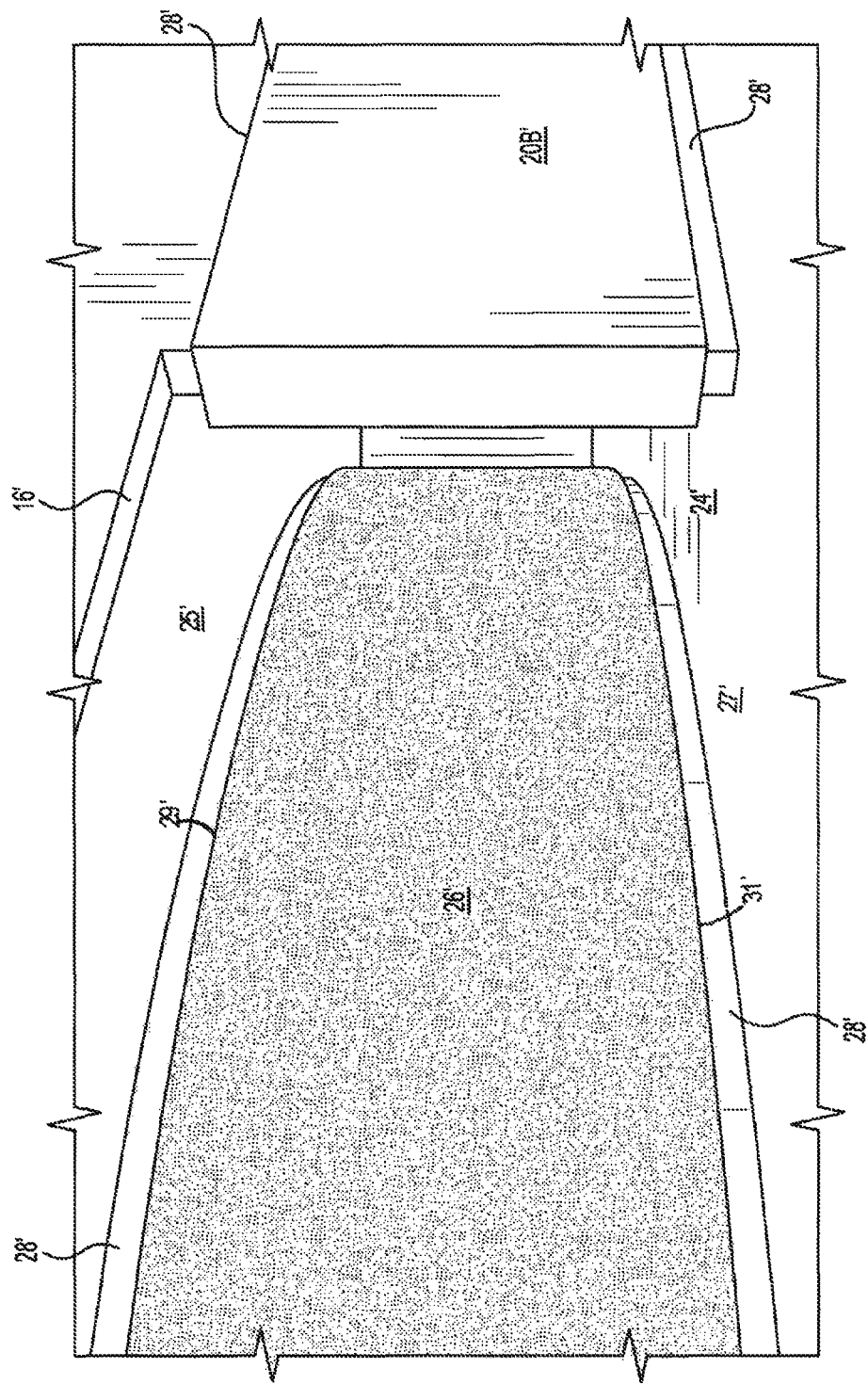
FIG. 7 is another front perspective view of the alternative design of FIG. 5.
Figure 8:
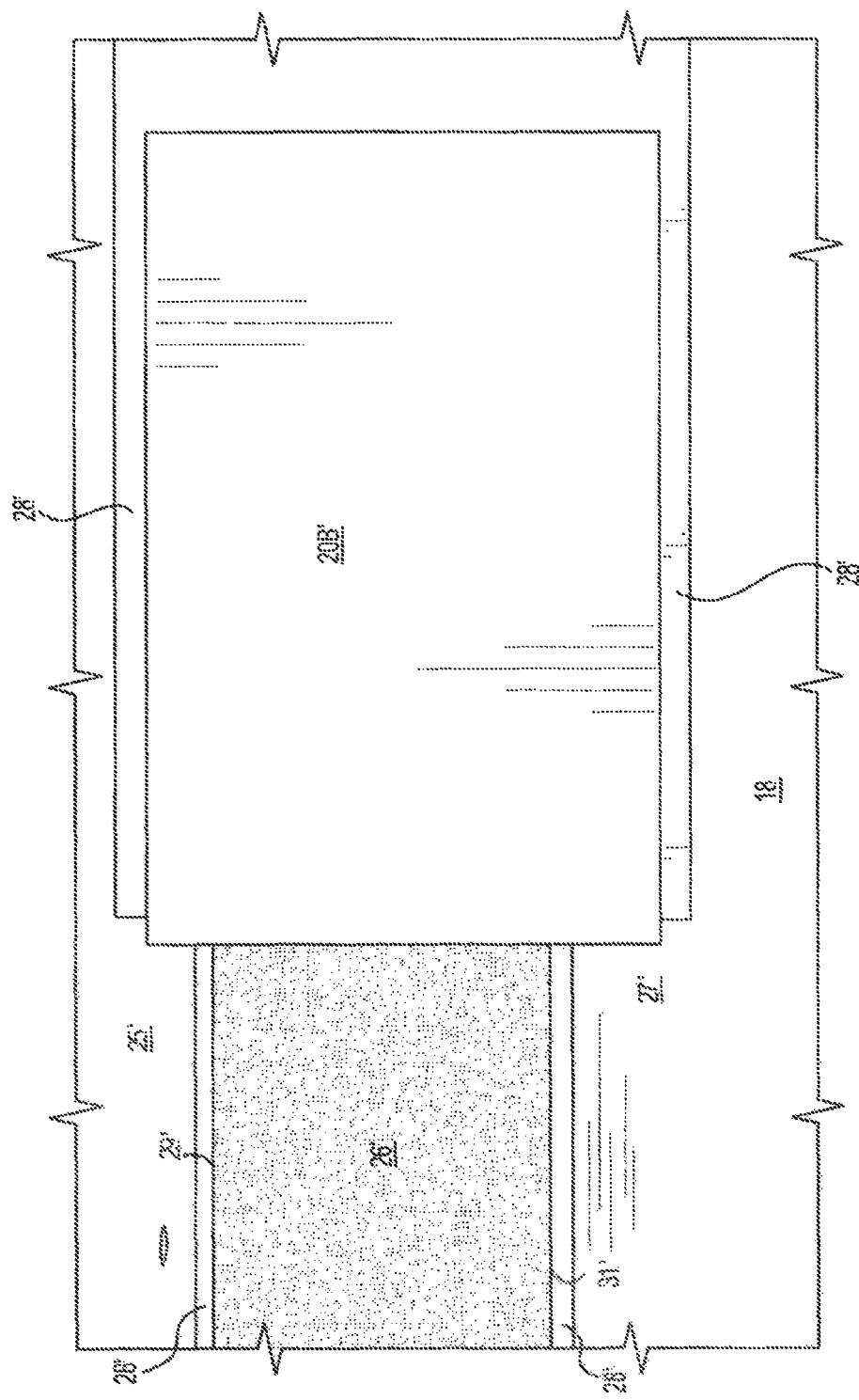
FIG. 8 is a front view of the alternative design of FIG. 5.

FIGS. 6-8 illustrate front views of the alternate design shown in FIG. 5. In this configuration, outer wall 20A' is positioned adjacent image projection wall 26'. Image projection wall 26' is shown to extend substantially between the floor 27' and the ceiling 25' of vestibule 24', but it may alternatively extend completely between floor 27' and ceiling 25'.

As may be appreciated from FIGS. 1, 3, 5 and 6, the curved image projection wall 26/26' obscures entrance 32A/32B/32' until the curved pathway in vestibule 24/24' is at least partially traversed by a customer. This is due to the convex curvature of image projection wall 26/26'.

Entryway 16' is positioned between outer walls 20A' and 20B' adjacent the left edge 33' of image projection wall 26'. In this design, border lighting 28' is positioned at the top edge 29' and bottom edge 31' of image projection wall 26', inner wall 22B', and along the top and bottom edges of outer walls 20A' and 20B' (in a similar manner, border lighting 28 in FIGS. 2-4 may be provided at the top and/or bottom edge of outer walls 20A and/or 20B). The border lighting 28' is positioned so that it is at the same level on outer walls 20A' and 20B', inner wall 22B', and image projection wall 26' so that it appears continuous from the outer walls into and throughout vestibule 24'. However, the border lighting may be positioned at either the top or bottom edges of the walls or may be absent from one or all of the walls 20A', 20B', 22B' and 26'.

FIG. 9 illustrates a plan view of an alternate design of the theater entrance in which an entryway 16'' is positioned between two flat outer walls 20A'' and 20B''. Entryway 16'' is positioned so that it is opposite to and at one side of the image projection wall 26''. In contrast to the design of FIG. 5, the design of FIG. 9 employs two doorways 32A'' and 32B'' at respective ends of the vestibule 24'' that lead to viewing area 14. This configuration assists in crowd control, i.e., upon exiting the theater, audience members can leave via either of the two doorways 32A'' and 32B'' which would aid in preventing overcrowding at one exit. The image projection wall 26'' may extend along the entire length of vestibule 24'', or it may extend across only a portion of the total vestibule length. Alternatively, a substantially mirror-image layout to the design shown in FIG. 9, wherein the entryway would be on the opposite side to that shown in FIG. 9, may be employed, as desired.

Those skilled in the art will appreciate that the conception, upon which this disclosure is based, may readily be utilized as a basis for designing other products. Therefore, the claims are not to be limited to the specific examples depicted herein. For example, the features of one example disclosed above can be used with the features of another example. Thus, the details of these components as set forth in the above-described examples, should not limit the scope of the claims.

Further, the purpose of the Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed is:

1. A theater configuration, comprising:
   a lobby;
   a seating area;
   an entrance to said seating area;
   a vestibule extending between said lobby and said entrance, said vestibule having a convexly curved image projection wall, a floor and a ceiling;
   said image projection wall positioned so as to be at least partially visible from said lobby;
   said floor of said vestibule comprising a curved pathway that connects said lobby to said entrance; and
   wherein said curved pathway is further defined by a curved inner wall and said image projection wall that are substantially parallel to each other.

2. The theater configuration set forth in claim 1, wherein said curved pathway includes border lighting.

3. The theater configuration set forth in claim 2, further comprising a walkway leading to said seating area, said walkway including additional border lighting.

4. The theater configuration set forth in claim 3, wherein said border lighting in said curved pathway and said additional border lighting in said walkway are substantially the same as each other.

5. The theater configuration set forth in claim 2, wherein said pathway is open, being bounded only by said image projection wall, said border lighting, said curved inner wall, said floor and said ceiling.

6. The theater configuration as set forth in claim 2, wherein said image projection wall has a top edge and a bottom edge, and said border lighting is located in a recess at the bottom edge of said image projection wall.

7. The theater configuration set forth in claim 1, wherein said curved image projection wall obscures said entrance until said curved pathway is at least partially traversed.

8. The theater configuration set forth in claim 7, wherein said curved image projection wall has a first convex curvature that obscures a portion of the image projection wall near said entrance until said curved pathway is at least partially traversed.

9. The theater configuration set forth in claim 1, wherein said entrance comprises a door that opens in a direction into said vestibule or away from said image projection wall.

10. A theater configuration, comprising:
    a lobby;
    a seating area;
    an entrance to said seating area;
    a vestibule extending between said lobby and said entrance, said vestibule having a curved image projection wall, a floor and a ceiling;
    said image projection wall positioned so as to be at least partially visible from said lobby;
    said floor of said vestibule comprising a curved pathway that connects said lobby to said entrance; and
    wherein said curved pathway is further defined by a curved inner wall and said image projection wall that are substantially parallel to each other.

11. The theater configuration set forth in claim 10, wherein said curved pathway includes border lighting.

12. The theater configuration set forth in claim 11, further comprising a walkway leading to said seating area, said walkway including additional border lighting.

13. The theater configuration set forth in claim 12, wherein said border lighting in said curved pathway and said additional border lighting in said walkway are substantially the same as each other.

14. The theater configuration as set forth in claim 11, wherein said image projection wall has a top edge and a bottom edge, and said border lighting is located in a recess at the bottom edge of said image projection wall.

15. The theater configuration set forth in claim 10, wherein said curved image projection wall obscures said entrance until said curved pathway is at least partially traversed.

16. The theater configuration set forth in claim 10, wherein said entrance comprises a door that opens in a direction into said vestibule or away from said image projection wall.

17. The theater configuration set forth in claim 10, wherein said pathway is open, being bounded only by said image projection wall, said border lighting, said curved inner wall, said floor and said ceiling.

18. An entrance for a theater, comprising:
    a lobby;
    a doorway;

a vestibule extending between said lobby and said doorway, said vestibule having a curved image projection wall and an inner wall opposite to said image projection wall;

said image projection wall positioned so as to be visible from said lobby;

a viewing area having a curved walkway that is connected by said doorway to said vestibule;

wherein said curved walkway has a left side and a right side that are substantially mirror images of each other and that are curved so that they extend across a rear side of a viewing area; and wherein said curved walkway terminates at two entry points at opposite sides adjacent said viewing area.

19. The entrance as in claim 18, wherein said curved walkway is defined by first and second curved walls that are substantially parallel to each other.

20. The entrance as in claim 18, wherein said vestibule includes a floor and a ceiling, said image projection wall extending substantially between said floor and ceiling.

21. The entrance as in claim 18, wherein said image projection wall and said curved walkway are approximately parallel to each other.

22. An entrance for a theater, comprising:
a lobby;
a doorway;
a vestibule extending between said lobby and said doorway, said vestibule having a curved image projection wall;
said image projection wall positioned so as to be visible from said lobby;
a viewing area having a curved walkway that is connected by said doorway to said vestibule; and
wherein said curved walkway is defined by first and second curved walls that are substantially parallel to each other.

23. The entrance of claim 22, wherein said curved walkway has a left side and a right side that are substantially mirror images of each other and that are curved so that they extend across a rear side of said viewing area.

24. The entrance of claim 22, wherein said image projection wall and said curved walkway are approximately parallel to each other.

25. The entrance as in claim 22, wherein said curved walkway terminates at two entry points at opposite sides adjacent said viewing area.

26. An entrance for a theater, comprising:
a lobby;
a doorway;
a vestibule extending between said lobby and said doorway, said vestibule having a curved image projection wall;
said image projection wall positioned so as to be visible from said lobby;
a viewing area having a curved walkway that is connected by said doorway to said vestibule; and
wherein said curved walkway is defined by first and second curved walls that are substantially parallel to each other.

27. The entrance of claim 26, wherein said curved walkway has a left side and a right side that are substantially mirror images of each other and that are curved so that they extend across a rear side of said viewing area.

28. The entrance of claim 26, wherein said image projection wall and said curved walkway are approximately parallel to each other.

29. The entrance as in claim 26, wherein said curved walkway terminates at two entry points at opposite sides adjacent said viewing area.

30. The entrance as in claim 26, wherein said vestibule includes a floor and a ceiling, said image projection wall extending substantially between said floor and ceiling.

31. The entrance as in claim 26, wherein said vestibule further comprises an inner wall opposite said image projection wall to define a path leading to said doorway.

* * * * *